Sept. 18, 1923.  
W. F. PFANDER  
HEADLAMP SUPPORT  
Filed Jan. 27, 1922

1,468,032

INVENTOR  
Walter F. Pfander  
BY Cornelius C. Billings  
ATTORNEY

Patented Sept. 18, 1923.

1,468,032

UNITED STATES PATENT OFFICE.

WALTER F. PFANDER, OF YONKERS, NEW YORK, ASSIGNOR TO DURANT MOTORS INCORPORATED, A CORPORATION OF DELAWARE.

HEADLAMP SUPPORT.

Application filed January 27, 1922. Serial No. 532,095.

*To all whom it may concern:*

Be it known that I, WALTER F. PFANDER, a citizen of the United States, and a resident of Yonkers, county of Westchester, and State of New York, have invented certain new and useful Improvements in Headlamp Supports, of which the following is a specification.

This invention relates to means for supporting automobile head-lamps and particularly to an improved swivel mounting which permits the head-lamp to be adjusted to different angles in both horizontal and vertical planes so that the beam of light projected can be directed correctly as will be understood by those skilled in the art.

The principal object of the invention is to provide a head light mounting which is readily detachable and adjustable.

Other objects will be apparent from the following specification when read in connection with the accompanying drawings, in which.

Figure 1:
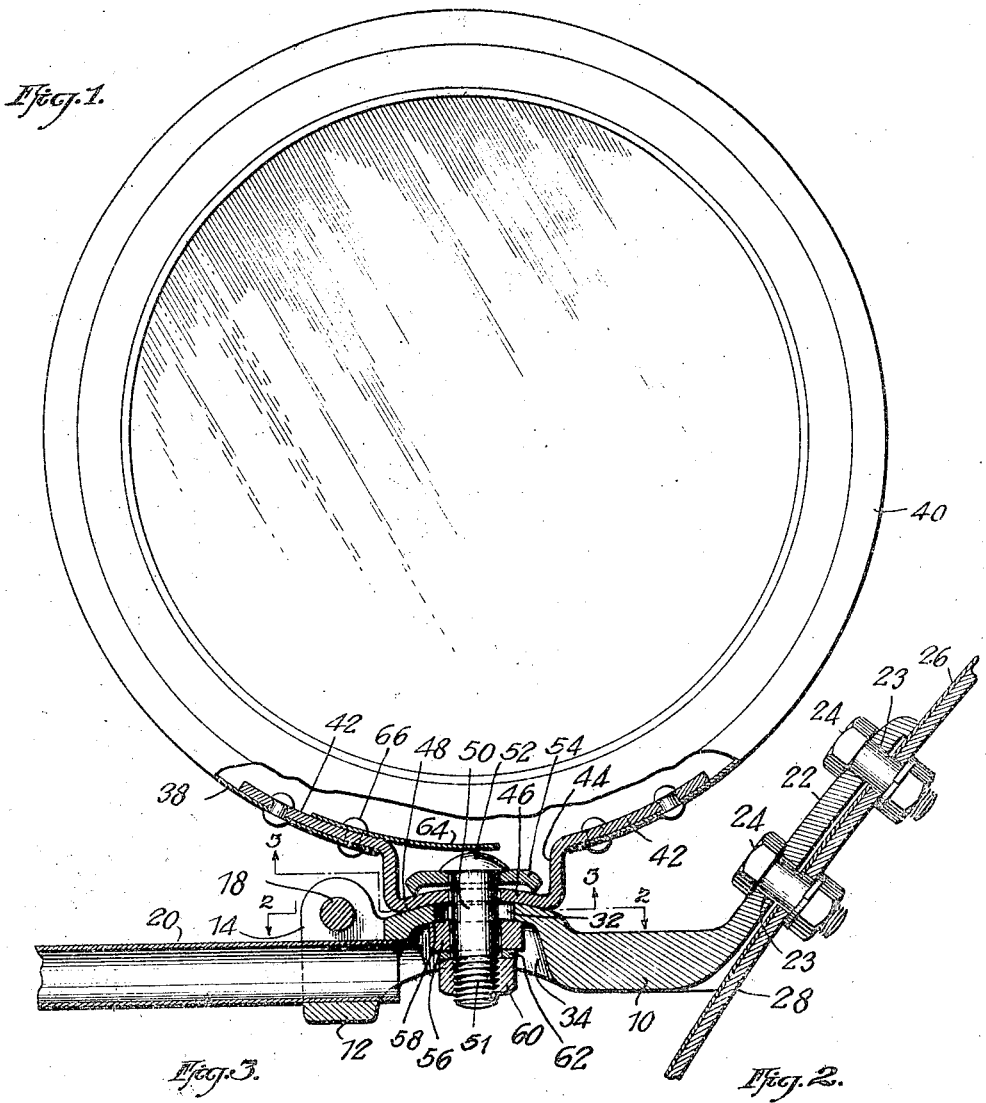
Fig. 1 is a sectional elevation of a head lamp support showing a headlight mounted thereon.
Figure 3:
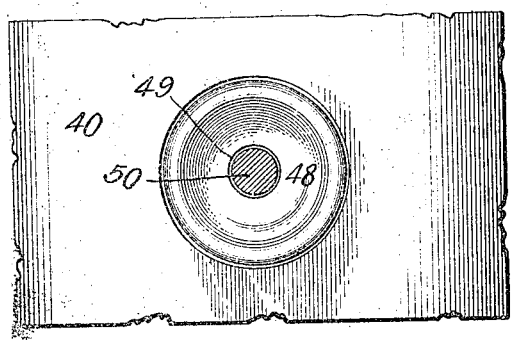
Fig. 3 is an underside plan of the head lamp, the securing stud being sectioned from the line 3—3 of Fig. 1.
Figure 2:
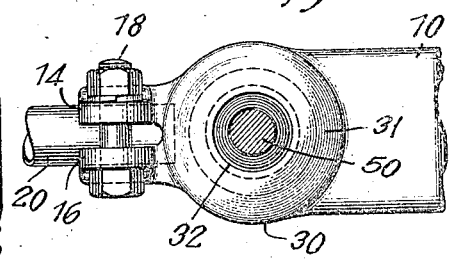
Fig. 2 is a section on line 2—2 of Fig. 1 showing the support in plan.

Referring to the drawings, the support comprises a member 10 which has a hub 12 formed thereon which is split as shown and provided with lugs 14 and 16 through which passes a bolt 18 which serves to clamp the members 10 to a rod 20 which extends across the front of the machine and is connected to a similar fitting on the other side of the automobile which supports the opposite head lamp. The fitting 10 is formed with an angularly disposed flange 22 which is provided with apertures 23 through which pass bolts 24 which secure said member to the front fender 26, the bolts passing through suitable apertures in said fender and in the front fender supporting bracket 28 which is secured to the chassis not shown.

The member 10 is formed with a boss 30, the upper convex surface 31 of which conforms substantially to the surface of a sphere. A central aperture 32 is formed in the boss and a chamber 34 is formed in the underside of the boss to accommodate the securing means to be described.

Riveted or otherwise secured to the casing 38 of the head lamp 40 is a bracket 42 having a downwardly extending boss 44 of hollow formation as shown and having a bottom wall 46 which is formed with a concave surface 48 to conform to the spherical surface 31 of the boss 30. The wall 46 of the bracket is formed with an aperture 49 through which extends the bolt 50 which secures the head lamp to the member 10. The bolt 50 is formed with a head 52. A cupped washer 54 is interposed between the head 52 of the bolt 50 and the inner surface of the wall 46 of the bracket 42.

Within the chamber 34 of the member 10 and surrounding the bolt 50 is a collar 56 the upper surface 58 of which is crowned to fit the curved surface of the upper face of the chamber 34 against which it abuts. A nut 60 engages threads 51 of the bolt 50 and a lock washer 62 is provided to prevent the former from jarring loose.

A spring finger 64 is secured to the bracket 42 by a rivet 66 and serves to prevent the bolt 50 from being inadvertently pushed up too far when the nut 60 is removed and also prevents the bolt from dropping into the lamp in the event the same is disconnected from the automobile and placed in an inverted position.

From the foregoing description it will be apparent that the direction in which the beam of light is projected can be accurately adjusted by loosening the nut 60 and turning the lamp 40 about the axis of the bolt 50. It will be further apparent the inclination of the axis of the bolt 50 can be changed by rocking the lamp either forward or backward or from one side to the other on the convex or spherical seat 31 of the member 10, and clamping it in the desired position by tightening the nut. It is clear therefore that the direction in which the head lamp throws its beam of light is universally adjustable.

As changes of construction could be made within the scope of my invention it is intended that all matter contained in the above description or shown in the accompanying drawings shall be interpreted as illustrative and not in a limiting sense.

Having thus described my invention what I claim as new and desire to secure by Letters Patent is:—

1. In a device of the kind described, a supporting member having a chambered boss formed thereon, the outer and inner surfaces of which are substantially spherical, a head lamp having a bracket secured thereto which is formed with a depending hollow boss whose lower wall is shaped to fit the spherical surface of the first named boss, a bolt having its head positioned in said depending hollow boss and extending through said bosses, a collar and clamp nut for securing said head lamp in a desired position of adjustment and a spring finger in said lamp bracket pressing against the head of said bolt to hold said bolt in position when said lamp is removed from said support.

2. In a device of the kind described, a supporting member having an angularly bent portion adapted to be attached to a fender, a chambered boss, the outer and inner surfaces of which are substantially spherical, and a split hub portion on the other side of said boss from said flange, a head lamp having a bracket secured thereto which is formed with a depending hollow boss whose wall is shaped to fit the spherical surface of the first named boss, a bolt having its head positioned in said depending hollow boss and extending through said bosses, a cupped washer between said head and said depending hollow boss, a collar and clamp nut for securing said head lamp in a desired position of adjustment and a spring finger in said lamp bracket pressing against the head of said bolt to hold bolt in position when said lamp is removed from said support.

In witness whereof, I have hereunto set my hand at 560 Jackson Blvd., Long Island City, county of Queens, State of New York, this 20th day of January, 1922.

WALTER F. PFANDER.